United States Patent [19]

Taddei

[11] 4,177,511
[45] Dec. 4, 1979

[54] PORT SELECT UNIT FOR A PROGRAMMABLE SERIAL-BIT MICROPROCESSOR

[75] Inventor: Vincent J. Taddei, West Chester, Pa.

[73] Assignee: Burroughs Corporation, Detroit, Mich.

[21] Appl. No.: 503,111

[22] Filed: Sep. 4, 1974

[51] Int. Cl.² .............................................. G06F 3/04
[52] U.S. Cl. .................................................. 364/200
[58] Field of Search ....................... 445/1; 340/172.5; 364/200 MS File, 900 MS File

[56] References Cited

U.S. PATENT DOCUMENTS

| | | | |
|---|---|---|---|
| 3,331,055 | 7/1967 | Betz et al. | 340/172.5 |
| 3,353,156 | 11/1967 | Ehrman | 340/172.5 |
| 3,417,374 | 12/1968 | Pariser | 364/200 |
| 3,465,298 | 9/1969 | LaDuke et al. | 340/172.5 |
| 3,500,466 | 3/1970 | Carleton | 340/172.5 |
| 3,639,909 | 2/1972 | Hauck et al. | 364/200 |
| 3,693,161 | 9/1972 | Price et al. | 364/200 |
| 3,708,785 | 1/1973 | Rawson et al. | 364/200 |
| 3,728,693 | 4/1973 | Macker et al. | 364/200 |
| 3,740,728 | 6/1973 | Pallen | 364/200 |
| 3,745,532 | 7/1973 | Erwin | 364/200 |
| 3,749,845 | 7/1973 | Fraser | 340/172.5 |
| 3,763,472 | 10/1973 | Sharp | 364/200 |
| 3,771,134 | 11/1973 | Huettner et al. | 340/172.5 |
| 3,878,514 | 4/1975 | Faber | 340/172.5 |
| 3,959,775 | 5/1976 | Valassis et al. | 364/200 |
| 4,020,472 | 4/1977 | Bennett et al. | 364/200 |

Primary Examiner—Gareth D. Shaw
Assistant Examiner—Thomas M. Heckler
Attorney, Agent, or Firm—Edmund M. Chung; Mark T. Starr; Kevin R. Peterson

[57] ABSTRACT

An apparatus and method for selecting the operation of digital data ports for regulating information flow between a programmable serial-bit, microinstruction processor and a multiplicity of peripheral devices connected to the processor is provided by a control pulse distribution circuit operating in conjunction with a controllable decoder circuit. Peripheral device designation instructions which may be available from the processor may define which of the ports will function, i.e., be "open", within the current processor cycle to enable communications between the processor and a device connected thereto. These designation instructions may be decoded to produce enabling signals for controlling the distribution of the timing and other associated pulses needed for the activation of a port. Operation of the selection apparatus may be as to permit data flow during a specified portion of each processor cycle.

4 Claims, 9 Drawing Figures

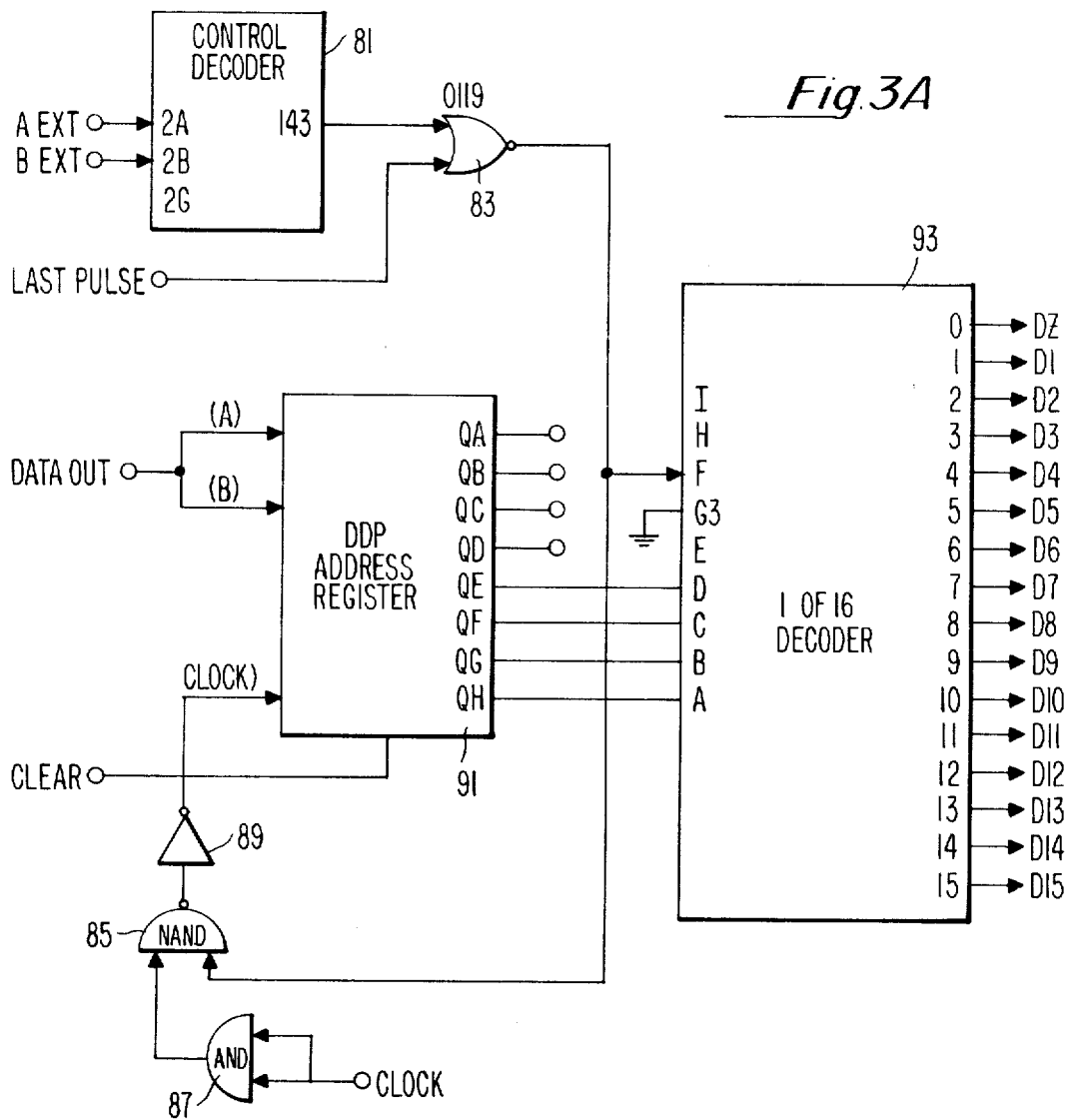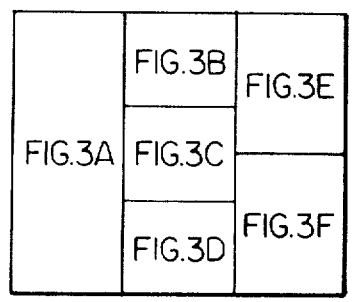

PORT SELECT UNIT FOR A PROGRAMMABLE SERIAL-BIT MICROPROCESSOR

BACKGROUND OF THE INVENTION

The present invention relates to a peripheral device selection interface for a digital microprocessor, and more specifically to a port select unit for a serial-bit, programmable microinstruction processor. The subject invention, furthermore, is designed for a particular type of processor unit as embodied in the teachings of Faber in patent application Ser. No. 307,863, filed Nov. 20, 1972 now U.S. Pat. No. 3,878,514 and assigned to the same assignee of the present application. The programmable unit disclosed therein is a serial-bit with byte transfer processor employing soft machine architecture through microprogramming. An instruction set, at the microprogram level, is provided for controlling the specific circuitry of the processor in executing basic computer operations. Essentially, the specific circuitry represents minimally committed logic or hardware which becomes committed to a specific task by control signals originating in the instruction set. Logic, control and addressing functions are performed by circuitry which includes only those gates, registers, drivers and related logic, which are necessary to implement the basic operations.

Such a processing unit may be comprised of five functional parts: (1) a logic unit which performs shifting, arithmetic and logic functions; (2) a microprogram memory which stores both literals and control words; (3) a memory control unit which provides the registers microprogram memory addressing; (4) a control unit which provides timing and conditional control, successor determination and instruction decoding; and (5) and external interface.

In the microprocessor, cited above, a microprogram memory (MPM) is addressed by a memory program count register (MPCR). Feeding this (MPCR) register is an alternate memory program count register (AMPCR). The AMPCR receives instructions from microprogram memory as well as from other registers within the processor.

Microprocessors of the Faber type are being used in larger and more complicated processing tasks than for which they were originally designed. While this processor's logic units and control units are sophisticated enough to handle the enlarged processing tasks, the micromemory capacity as designed into the basic apparatus is not large enough. This shortcoming of limited memory capacitor exists in most microprocessors in the class of Faber size processors. The compactness of the basic processor as implemented in a single MOS chip or in a single TTL-printed circuit card unit did not, with yesterday's technology, permit extensive micromemory capacity. In an installation where more memory capacity is needed this capacity must be peripheral to the basic processor and be addressed through the processor interface.

Moreover, in a typical processor application, a variety of peripheral devices, such as process sensors, process controllers, tape reader/writers, transmission terminals, etc., will be connected to the basic microprocessor. The basic processor must access each peripheral in order to communicate with that peripheral.

An interface concept which has been introduced in conjunction with a parallel operation, microinstruction processor system, capable of multiple processing, is port selection. This concept enables communication interlocking between each of the processor and the peripheral devices and has involved a definition of all peripherals as being on an equal plane, regardless of function, and as being located at a specific address. Information buses to each peripheral device can thusly be considered as portals or ports to that device through which that device may be accessed. A port select from the processor will control the opening of a specific port.

The port selection for a parallel processor multiprocessing system, however, involved a complex interlocking signal scheme dependent upon various status signals and interrupt signals to monitor each data port. The selection unit was dependent upon locked and unlocked status modes, selected and unselected status modes and data interrupt signals. A priority selection logic unit was employed to monitor signal operation. The complexity of such a port select unit resulted in relatively slow operation of peripheral selection and consequently a slower processing speed for the entire system. It would be desirable, therefore, to have a port selection unit for a serial-bit microinstruction processor which is capable of higher operating speeds.

An objective of this invention is to provide a simplified port selection apparatus and method for interfacing a serial-bit microinstruction processor to a plurality of peripheral devices in a single processor system.

Another objective of this invention is to provide an exclusive port selection apparatus wherein only one peripheral at a time communicates with the processor.

A further objective of this invention is to provide a port selection unit which is easily expanded with minimal impact, if any, upon the existing circuit design.

SUMMARY OF THE INVENTION

The objectives of this invention are achieved in a port selection unit for selecting interface connections between the input and output data buses of a serial-bit processor and a plurality of assorted peripheral devices. Each device may be treated as equal to the other devices, with data lines from the processor's data buses to each peripheral device's input-output interface circuitry. A device may therefore be considered as residing at an address, with the data lines and its own input-output circuitry being considered as the data port to the device. Timing clock pulses and related signals necessary for the operation of a peripheral device may be gated to each device on an exclusive basis. Each device may thusly be energized and de-energized for communication with the processor.

A device to be accessed may be specified by an address in the processor. The address may be transformed to parallel-bit information and then decoded to instruct a plurality of pulse selection matrices in the distribution of operation timing pulses to the specified peripheral device. These timing pulses energize that device for communication with the processor. Control signals may latch the various circuit components to assure exclusive communication with the processor via the common data buses.

DESCRIPTION OF THE DRAWINGS

The features of this invention will become more fully apparent from the following detailed description, attached claims and accompanying drawings in which like characters refer to like parts and in which:

DETAILED DESCRIPTION

The invention is an apparatus and method which may be used to cause an interconnection between the data buses of a microinstruction microprocessor and a plurality of assorted peripheral devices so that the processor may perform a read or write operation of a microinstruction work or a data word, during a portion of a processor cycle, for performing microinstruction processing. Peripheral devices may include microinstruction memories of assorted structure, i.e., disk, tape and solid state sensors, industrial process controllers, telegraphy devices, etc. The apparatus is designed to be compatable with, but is not exclusively limited to operation with the serial-bit microprocessor described as follows.

Figure 1:
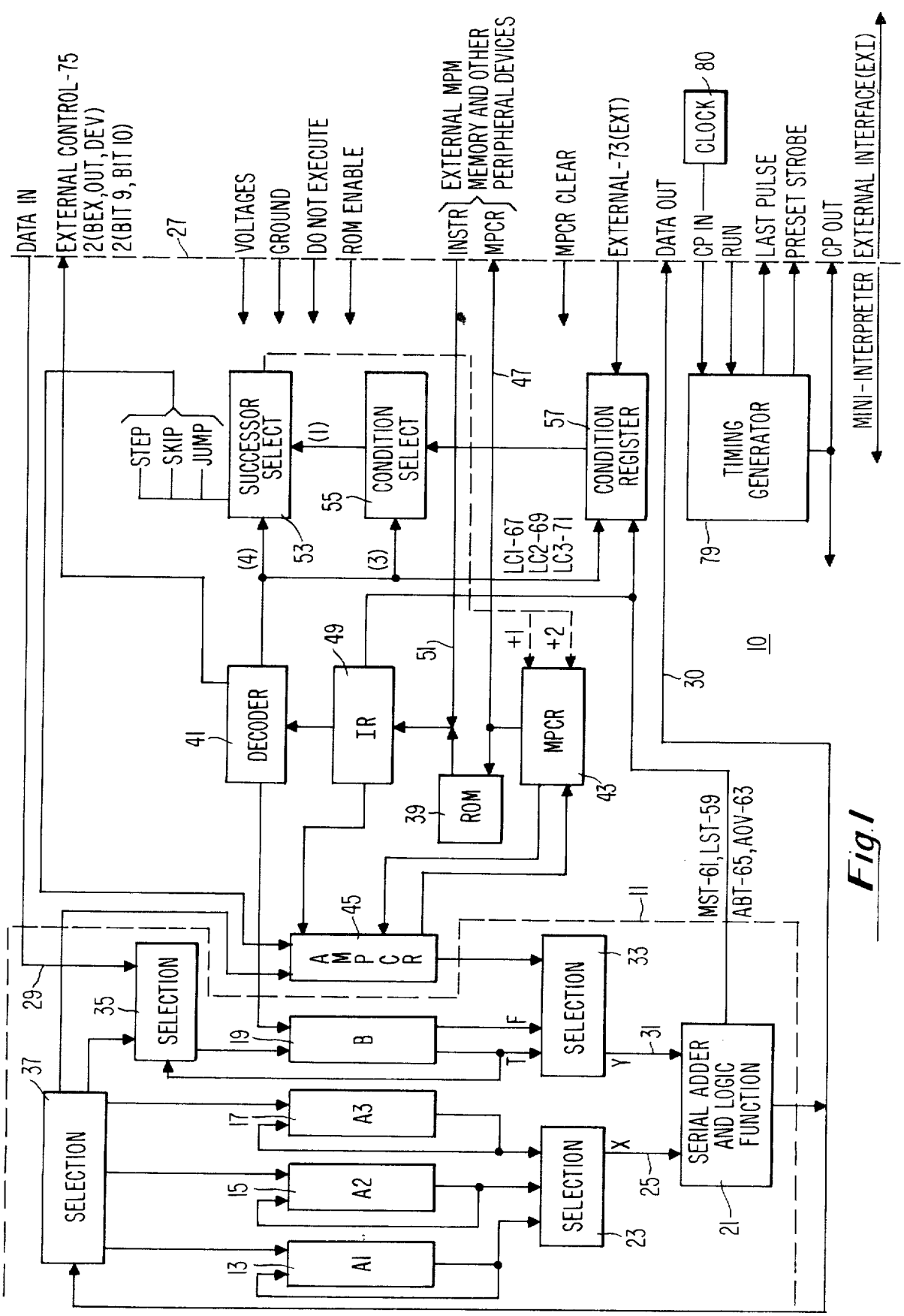
FIG. 1 is a detailed block diagram of the base processor.

The base microprocessor 10 includes a processing unit 11 (FIG. 1). The logic unit 11 is comprised of three 8-bit recirculating shift registers 13, 15, and 17 connected to parallel and denominated registers A1, A2 and A3, respectively, an 8-bit recirculating shift register 19, denominated the B register, and a serial adder 21. The recirculating capability of registers 13, 15, 17 and 19 enables information to be transferred into the adder 21 without changing the contents of the respective input register. Further functions of the processor as illustrated in this FIG. 1 will be brought out in the discussion below.

A registers 13, 15 and 17 are functionally identical and may be used to temporarily store data within the logic unit 11. A selection gate network 23 permits the contents of any of A registers 13, 15 or 17 to be loaded as one input, denominated the X input 25 of adder 21. B register 19 is the primary interface into the processor 10. Data from external sources is entered via data interface 27 and DATA-IN bus 29. The B register 19 also serves as a second, or Y, input 31 via a selection network 33 to the adder 21, and collects certain side effects of arithmetic operations. A selection network 35 selects the input to B register 19 from DATA IN, external interface 27, the output of adder 21 via a selection network 37 or a recirculating feedback loop of the "true" contents of the B register 19 from its "true" output. Selection network 37 also permits the output of adder 21 to be fed to A registers 13, 15, and 17. In addition, literal values which are decoded from certain microinstructions stored in an optional microprogram memory 39 are fed directly to the B register 19 from a microinstruction decoder 41. As implied above, B register 19 has a true-false output which may be selected to be fed as the Y input 31 of adder 21 by the selection network 33. The purpose is to provide adder 21 with either the true value or the one's complement of the value in B register 19.

Adder 21 is a conventional type serial adder as known in the art. The output of adder 21, besides being tied to components within the processor, is connected via information-data out bus 30 to interface 27 for communication to devices external to the processor.

Microprogram memory (ROM) 39, as shown also in FIG. 1, is a 256 word 12 bit read-only memory which may optionally be included in the processor hardware configuration or which may be located externally to the processor and accessed via external interface 27. In this latter case an external memory capacity can be expanded via memory access circuitry.

A memory control unit comprises two 8-bit registers, i.e., a microprogram count register 43 (MPCR) and an alternate microprogram count register 45 (AMPCR). MPCR 43 is an 8-bit counter which can be incremented by one or two and is used to address MPM 39 (select each instruction from microprogram memory 39) or any external memories connected via bus 47 and interface 27. MPCR 43 may be expanded to 12 or 16 bits by the substitution of a 12 or 16 bit counter for the 8-bit counter.

AMPCR 45 can hold an alternate address which is needed for microprogram manipulation. When not required for this purpose, AMPCR 45 can be used by the logic unit 11 as a scratch pad register. The contents of AMCPR 45 can be fed to adder 21 as its Y input 31 via selection network 33 or can be clocked directly into MPCR 45. AMPCR 45 can be loaded by the output from adder 21 via selection logic 37, or from MPCR 43 or from microprogram memory 39 (MPM) or from an instruction register 49 which is tied to the output of microprogram memory 39 or to external memories via bus 51. When more than 8 bits are to be transferred into AMPCR 45 they may be concatenated wit the use of instruction register 49. The output from MPCR 43 is tied to the memory 39 and/or to peripheral devices via output data bus 47.

The programmable processor requires a source of microprogram instructions to define the operation of the processing unit. This source is provided by microprogram memory 39 or external microprogram memory which can either be a Read/Write or a Read Only memory. Memory 39 is a read-only memory (ROM) that contains the program defining the processing unit's function when the ROM enable line is true. ROM enable line select enables the instruction source to be from the internal memory 39 in the presence of a true bit, and from the external source in the presence of a false bit. Each microinstruction from memory 39 is 12 bits in length and is decoded by the decoder 41. The 12 bits of each instruction are decoded into one of four types, namely, (1) literal, (2) condition, (3) logic and (4) external.

Memories external to the basic processor can be considered peripheral to the processor. Other peripherals which may have information handling components, i.e., registers etc., can be considered similar to external memories in that information, such as microinstruction words, from these peripheral devices is available to the instruction register 49 via a coupling to the instruction data bus 51. Locations in peripheral devices may also be addressed from MPCR 43 via the MPCR data bus 47.

The processor control unit includes a microinstruction decoder 41, successor (or next instruction) determination logic 53, condition selection logic 55, and a condition register 57. The successor determination logic 53, the condition selection logic 55 and the condition register 57 are activated by the output of the microinstruction decoder 41. In addition, the adder 21 feeds four condition bits to the condition register 57, namely the least significant bit true (LST) condition 59, the most significant bit true (MST) condition 61, the adder overflow bit, (AOV) 63, and an all bits true indicator bit (ABT) 65 (if all bits of the adder output are true 1's). The successor determination logic 53 determines whether to use the contents of the MPCR, register 43, incremented by 1 or by 2, or to use the contents of AMPCR, register 45 for addressing the next instruction stored in microprogram memory 39 or external memories. Additionally, condition register 57 feeds 8 bits to condition select 55 which in turn selects one bit to successor select 53.

The condition register 57 stores three resettable local condition bits (LC1 bit 67, LC2 bit 69 and LC3 bit 71, respectively), and selects one of 8 condition bits (the 4 adder condition bits, MST bit 61, LST bit 59, AOV bit 63 and ABT bit 65; an external condition bit EXT 73; and the three local condition bits LC1, LC2 and LC3 stored in condition register 57).

External interface 27 connects the programmable unit with external elements related to a multiprocessing system. This connection is synchronized by one internally generated clock signal train available to aid in performing 8-bit serial transfers into and out of the programmable unit. The external asynchronous input EXT 73 to condition register 57 is available for signalling from the external environment in the form of the EXT condition bit, while the four external control lines 75, from decoder 41 are utilized to control the use of external registers.

Timing circuitry 77, including a hexadecimal counter, is interconnected to all components and in addition to generating basic clock pulses generates control pulses for information transfers while the system.

Figure 2:
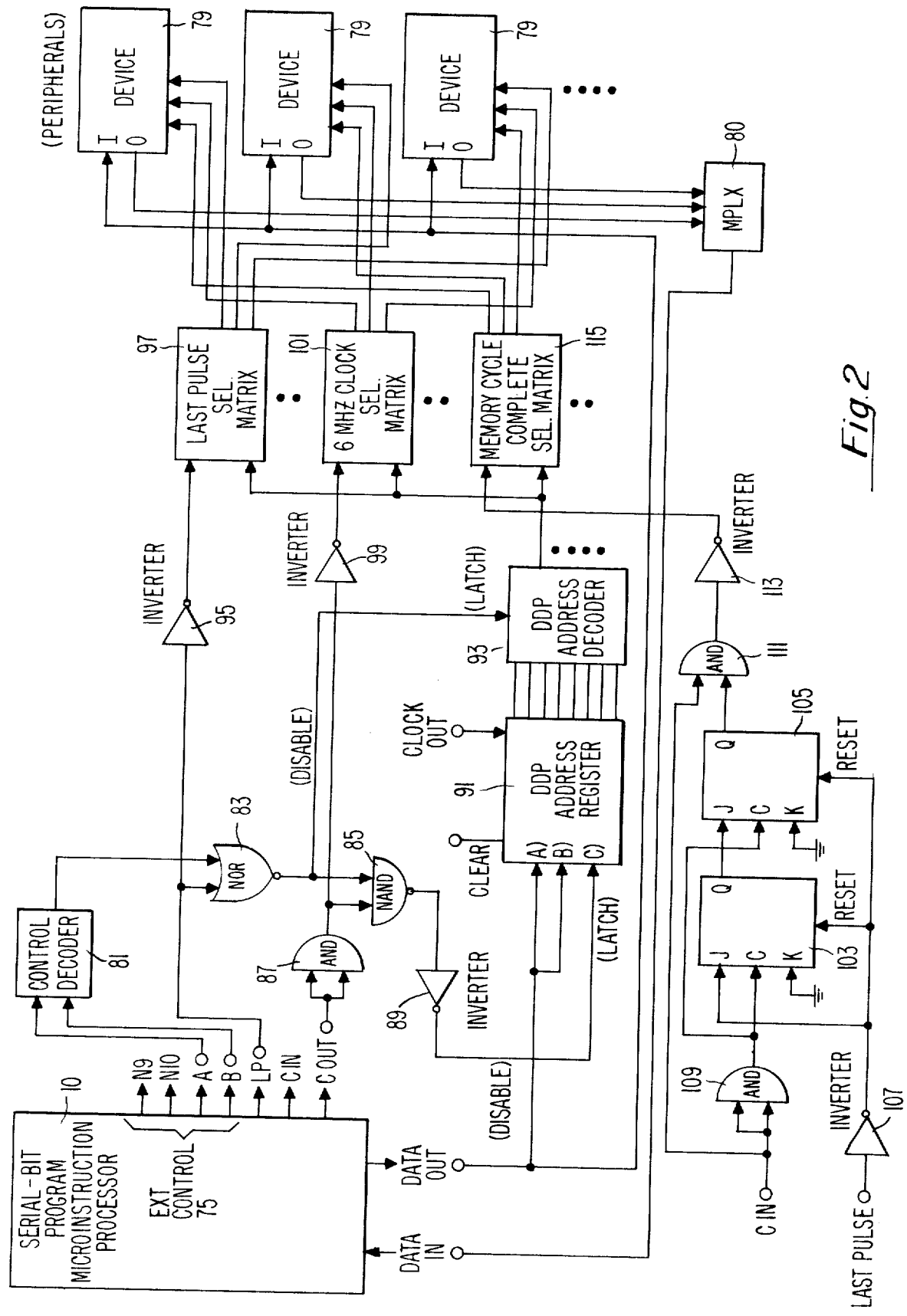
FIG. 2 is a general block diagram of the port selection apparatus, including the peripheral devices connection thereto.

A block diagram of the circuitry specific to the port selection unit is shown in FIG. 2. A plurality of peripheral devices 79, which as described above, may include memory modules, process controllers, etc., and may accept three timing pulses within the system. These timing pulses include a 6 mhz clock, processor operation, last pulse signals and memory cycle complete signals, which will be further described below.

When these timing pulses are removed from a device, the device will not function. Each of the devices 79 can therefore be controlled in their operation by supplying or denying the basic timing pulses to each module 79. Each of the devices 79 can include a serial to parallel converter as part of its design when information format transportation is required. The input terminals of each of the peripheral devices 79 are connected in common to the data out bus 30 of the processor 10. (It is understood that each line connected to the processor 10 connects thereto via the processor interface 27, FIG. 1. However, for the sake of brevity, reference to interface 27 will not be expressly made in the following description). Connected to each of the devices 79 output is a data multiplexor 80 which feeds the outputs of each of the devices 79 to the data-in bus 29 of the processor 10.

Connected to the A and B output terminals of processor instruction decoder 41 (FIG. 1), via the external control 75 is a control decoder 81. The output of decoder 81 is connected to one input of a two-input NOR gate 83.

NOR gate 83 has its other input connected to the "last pulse" signals from the processor 10 and its output connected to one input of a two input NAND gate 85.

NAND gate 85 has its other input connected to the output of a two input AND gate 87 and its output connected to the input of an inverter 89.

AND gate 87 has both of its inputs connected to the "clock-out" signals from the processor 10.

A digital data port address, serial-to-parallel register 91 is enabled or disabled on its "c" serial-bit input by the output from the inverter 89. Register 91 has its "A" and "B" serial bit-inputs ganged to the data out bus 30 from the processor 10. The register 91 is clocked on its clock input by the "clock-out" signals from the processor 10.

An address decoder 93 has its 8 bit parallel input tied to the 8 bit parallel output of the register 91. The operaion of the decoder 93 is controlled by the presence of absence of a signal from the output of NOR gate 83 on its enable terminal.

An inverter 95 feeds "last-pulse" signals, which it receives from the processor 10, to a last pulse selection matrix 97.

Another inverter 99 feeds "clock" pulses, which it receives from the output of and gate 87, to a clock selection matrix 101.

Memory cycle complete signals are generated from a dual J-K flip flop circuit. The first J-K flip flop 103 and the second J-K flip flop 105 have their K-inputs tied to ground. An inverter 107 receives "last-pulse" signals from the processor 10 which in turn feeds to the J-input of flip-flop 103, the reset terminal of flip-flop 103 and the reset terminal of flip-flop 105. A two-input AND gate 109 with its inputs ganged to the "clock-in" pulses from the basic clock 80 (FIG. 1) has its output connected to the clock input terminals of flip flops 103 and 105 respectively. The Q-output of flip flop 101 connects to the J-input of flip flop 105.

A two-input AND gate 111 is connected on one of its inputs to the Q-output of flip-flop 105 and on the other of its inputs to the "clock-in" pulse signals from the basic clock 80 (FIG. 1). The output of gate 111 carries memory cycle complete signals and is connected to the input of an inverter 113.

Inverter 113 feeds memory cycle complete signals to a memory cycle complete signal selection matrix 115.

Each of the selection matrices 97, 101 and 115 has its inputs connected to outputs of decoder 93. As a function of a signal on an input line from decoder 93, the last pulse signals received by the matrix 97 from the inverter 95 are selected to pass to one of the devices 79. As a function of a signal on an input from decoder 93 the clock pulses received by the matrix 101 from the inverter 99 are selected to pass to one of the devices 79. As a function of a signal on an input line from decoder 93 the memory cycle complete signals received by the matrix 115 from the inverter 113 are selected to pass to one of the devices 79.

The selection matrices 97, 101 and 115 are similar in construction so that all timing signals are passed to the same one of the peripheral devices 79 at the same time. This circuitry is discussed in further detail below.

FIG. 3 includes FIGS. 3A, 3B, 3C, 3D, 3E and 3F and these figures shows a more detailed presentation of the blocks of FIG. 2. For example, Decoder 81, Address Register 91 and Decoder 93 are shown more specifically relative to their typical circuit types and interconnections in FIG. 3A.

Figure 3B:
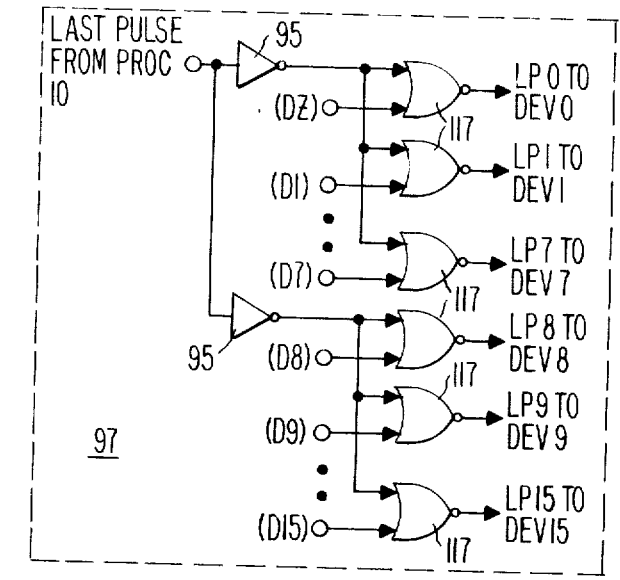
FIG. 3 includes FIGS. 3A, 3B, 3C, 3D, 3E, and 3F, which taken together show a more detailed circuit diagram of the selection components of FIG. 2. They are shown substantially in the same relative positions illustrated in FIG. 2.
Figure 3C:
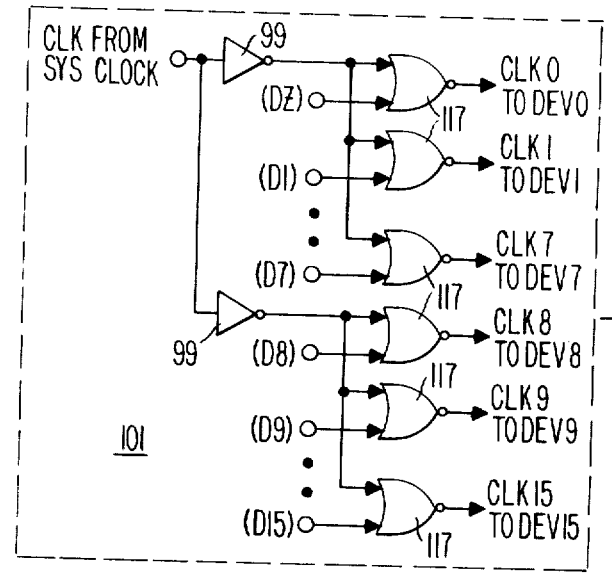
Figure 3D:
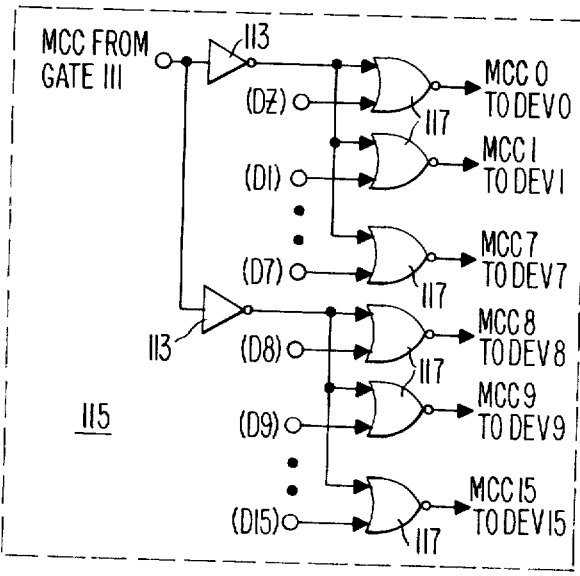
Figure 3E:
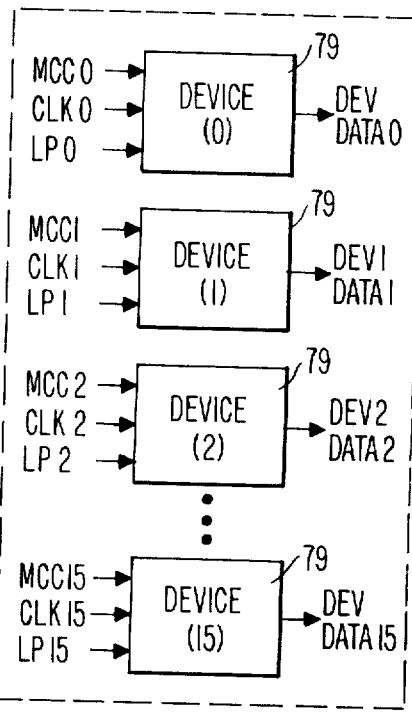
Figure 3F:
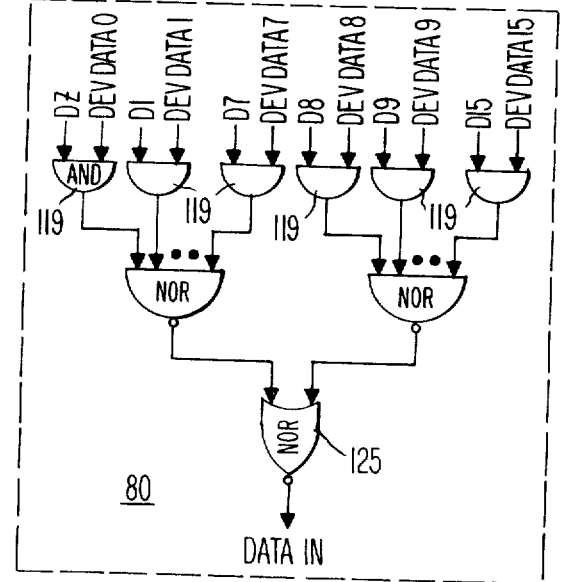

Similarly, FIG. 3B illustrates in detail matrix 97 of FIG. 2, while FIGS. 3C and 3D show matrices 101 and 115 of FIG. 2. FIG. 3F illustrates multiplexor 80, with its related circuitry, and the multiplicity of peripheral devices 79 is shown in FIG. 3E.

The A and B external control 75 signals from the processor 10 instruction register 49 are input to terminals 2A and 2B of control decoder 81. Typically, decoder 81 is a Texas Instrument 745139 type device.

The 143 terminal output of the decoder 81 is connected to one input of two-input NOR gate 83. The other input of NOR gate 83 is tied to the last pulse signal.

Address register 91 typically is a Texas Instrument 74164 type device. The data out information from bus 30 of the processor is entered on A and B input terminals of the register 91. Register 91 has its clock terminal connected to the output of inverter 89 which in turn is input from the output of NAND gate 85.

Two-input NAND gate 85 is input from the output of NOR gate 83 and from the output of NAND gate 87.

AND gate 87, as described above, has its inputs tied to the system clock pulses.

Decoder 93 is a one of 16 decoder typically of the type Texas Instrument 74154. Decoder 93 can have up to all of its 8 input terminals A through I tied to an output of the register 91. In the instance as shown in the FIG. 3, where a lesser number of devices need be addresssed, a lesser number of connections need be made. In the current application there are 16 devices, therefore, the four least significant bits of output from the register 91 are fed to the decoder 93. Thusly, the QE, QF, QG and QH output terminals of register 91 are tied to the D, C, B, and A input terminals of decoder 93 respectively.

The output lines from decoder 93 which are labled D2 through D15 are connected to selection matrices 97, 101, and 115 and multiplexor 80 as discussed below.

The selection matrices 97, 101 and 115 are identical in construction. Each includes 16 two-input NAND gates 117. Connected to one input of each NAND gate 117 of each matrix 97, 101, and 115 is one of the 16 outputs D2–D15 of decoder 117. The other input of gates 117 of the matrices 97, 101 and 115 are connected to the last pulse signals, clock signals, and memory cycle complete signals, respectively, in the following manner.

The last pulse signals from the processor 10 pass through an inverter 95, FIG. 2. Inverter 95 is, in actuality, two identical inverters, connected in parallel, so as to feed 8 of the NAND gates 117, each, for the pulse selection matrix 97.

The 16 outputs of the NAND gates 117 of matrix 97 are connected, one each, to the 16 peripheral devices 79, thereto a terminal, of the devices 79, designated for receiving memory cycle complete signals. These matrix 97 output connections are as follows. The output of the NAND gate 117 with the DZ signal on its input is connected to the first or "0" device 79. The output of the NAND gate 117 with the D1 signal on its input is connected to the second or "1" device 79. Connections are thusly made in order, until the 16th or "15" device 79 is connected to the output of the NAND gate 117 which is input from D15.

The matrices 101 and 115 are each structured similarly.

Inverters 99 and 113 are identical to 95, i.e., in actuality they are a pair of inverters, each driving 8 of the NAND gates 117, of each matrix 101, 115 respectively.

The 16 NAND gates 117 of the matrices 101, 113, in a similar manner to the matrix 97 are each enabled by a single one of the output lines from the decoder 93.

In each instance for the matrices 101, 115, a NAND gate 117 enabled by DZ from decoder 93 feeds "0" device 79, a NAND gate 117 enabled by D1 feeds "1" device 79, and so forth.

With this apparatus each of the devices 79 may be fed, on an exclusive basis, all of the three control signals, i.e., clock pulses, last pulse signals, and memory control signals, in parallel.

Multiplexer 80 includes 16 two-input AND gates 119. One input of each gate 119 is connected to a different output of decoder 93. The other input of each gate 119 is connected to the output of a different one of the decoders 79 in the same order as are the decoder 93 connections, i.e., a gate 119 which is connected to D2 output of decoder 93 is also connected to the output of the "0" device 79, a gate 119 input by the D1 output of decoder 93 is also input from the output of the "1" device 79, etc. The outputs from 8 of the AND gates 119 connect to the inputs of an eight input NOR gate 121. The output from the other 8 of the AND gates 119 connect to the inputs of a second eight input NOR gate 121. In addition, outputs from NOR gates 121, 123 feed a two-input NOR gate 125. NOR gate 125 has its output connected to the data in bus 29 of the processor 10.

The invention, therefore, provides a method of accessing peripheral devices 79 by a serial-bit microinstruction microprocessor 10 in a simple and efficient manner. By directing signals necessary for the operation of each peripheral 79 the port select unit under the direction of an address supplied from the processor 10 is able to selectively activate, on an exclusive basis, one of the peripherals. Thus, even though the inputs of each peripheral are bussed, connected in parallel, to the data-in bus 29 of the processor 10, only one peripheral 79 is active at a time to operate upon the information. In this manner a port is selected.

Multiplexor 80 is included in the design because tri-state output devices 79 were not uniformly available. If tri-state output devices are used, multiplexor 80 is not needed. With multiplexor 80 removed, the outputs of the devices 79 can be connected in common to the data in bus 29 of the processor. Again, since only one device operates at a time, there are no information transfer conflicts.

When in operation, a control word is generated within the processor 10. This word signifies to the port selection apparatus that an address for a new port is available. This word is decoded via decoder 81 and fed as an enable condition to register 91 and decoder 93. In the presence of this enable condition a word transmitted out of the processor 10 on the data out line is taken to be the new port address. This word is transformed from serial to parallel format by register 91 and transferred to decoder 93 wherein it is decoded to produce an enable signal to a corresponding gate in each of the three selection matrices 97, 101, and 115 for passing all of the operating pulse signals concurrently to one of the devices 79. In this manner, one of the devices 79 is activated for communication with the processor 10.

In the next cycle the control word from the processor 10 changes in order to disable register 91 and decoder 93. Information now received from data-out bus 30 is taken as data and is received and operated upon by the active peripheral.

In this manner, different peripherals 79 are selected for communication with the processor 10.

It is intended that all matter contained in the above description or shown in the accompanying drawings shall be interpreted as illustrative and not in a limiting sense. Many different embodiments of this invention could be made without departing from the scope thereof.

What is claimed is:

1. An apparatus for establishing communication paths between a plurality of peripheral devices and a serial-bit data processor, said processor including means for providing external interface control signals and serial peripheral designation information, each of said plurality of peripheral devices being enabled for communications with said processor responsive to said external interface control signals, comprising:

means for transforming said serial designation information from said processor to parallel information;

means connected to said transforming means for decoding said transformed designation information;

means connected to said plurality of peripheral devices and to said means for providing said external interface control signals and responsive to said decoding means for selectively gating said control signals to said plurality of peripheral devices in accordance with said decoded designation information, said means for selectively gating including;

a first matrix connected between said means for providing external interface signals and said plurality of peripheral devices and responsive to said decoding means for providing a given one of said external interface control signals to said one of said plurality of peripheral devices specified by said decoded designation information, a second matrix connected between said means for providing external interface signals and said plurality of peripheral devices and responsive to said decoding means for providing a second given one of said external interface control signals to said one of said plurality of peripheral devices specified by said decoded designation information, and a third matrix connected between said means for providing external interface signals and said plurality of peripheral devices and responsive to said decoding means for providing a third given one of said external interface control signals to said one of said plurality of peripheral devices specified by said decoded designation information, said communications path being enabled only when said one of said plurality of peripheral devices specified by said decoded designation information has received said given one, said second given one and said third given one of said external interface control signals; and means responsive to said selectively gated control signals for enabling a communications path between said processor and one of said plurality of peripheral devices specified by said decoded designation information.

2. The apparatus of claim 1 including control means coupled to said transforming means and said decoding means and responsive to certain of said interface control signals provided by said processor for controlling the operation of said transforming means and said decoding means.

3. The apparatus of claim 1 wherein said processor also includes input and output information buses and wherein said communications path enabling means includes:

multiplexing means responsive to said decoding means for connection of said input bus to said specified one of said plurality of peripheral devices.

4. The apparatus of claim 2 wherein said processor also includes input and output information buses and wherein said serial peripheral designation information is obtained from said output information bus and wherein said transforming means includes a latchable serial to parallel register having data and enabling outputs, said data input of said register being connected to said output bus, and said enabling input being connected to said control means.

* * * * *